United States Patent
Craig et al.

(10) Patent No.: US 10,517,214 B2
(45) Date of Patent: Dec. 31, 2019

(54) PLANT SAWING ASSEMBLY

(71) Applicants: Arthur M. Craig, Hutto, TX (US);
Donna G. Craig, Hutto, TX (US)

(72) Inventors: Arthur M. Craig, Hutto, TX (US);
Donna G. Craig, Hutto, TX (US)

(*) Notice: Subject to any disclaimer, the term of this patent is extended or adjusted under 35 U.S.C. 154(b) by 52 days.

(21) Appl. No.: 15/813,337

(22) Filed: Nov. 15, 2017

(65) Prior Publication Data
US 2019/0141890 A1 May 16, 2019

(51) Int. Cl.
| A01D 34/84 | (2006.01) |
| A01D 34/90 | (2006.01) |
| A01G 3/06 | (2006.01) |
| B23B 51/04 | (2006.01) |
| A01B 1/06 | (2006.01) |
| B27B 5/12 | (2006.01) |

(52) U.S. Cl.
CPC .............. *A01D 34/84* (2013.01); *A01D 34/90* (2013.01); *A01G 3/067* (2013.01); *A01B 1/065* (2013.01); *B23B 51/0406* (2013.01); *B27B 5/12* (2013.01)

(58) Field of Classification Search
CPC ......... A01D 34/84; A01D 34/90; A01G 3/067
USPC ..................................................... 172/13, 15
See application file for complete search history.

(56) References Cited

U.S. PATENT DOCUMENTS

| 3,111,995 | A | * | 11/1963 | Dahl | ........................ A01G 3/06 |
| | | | | | 172/18 |
| 3,554,293 | A | | 1/1971 | Aman | |
| 3,565,179 | A | * | 2/1971 | Paliani | ................... A01B 1/246 |
| | | | | | 172/19 |
| 3,938,249 | A | | 2/1976 | Chacon | |
| 3,960,218 | A | * | 6/1976 | Atchley et al. | .......... A01G 3/06 |
| | | | | | 172/13 |
| 4,547,966 | A | | 10/1985 | Eden | |
| 4,832,131 | A | | 5/1989 | Powell et al. | |
| 5,242,024 | A | * | 9/1993 | Van Houten | ............. A01B 1/24 |
| | | | | | 172/19 |
| 5,461,788 | A | | 10/1995 | Taylor | |
| 5,810,093 | A | * | 9/1998 | Howard | ................. A01B 1/065 |
| | | | | | 172/111 |
| 6,311,782 | B1 | | 11/2001 | Plasek et al. | |
| 6,412,568 | B1 | | 7/2002 | Thede | |
| D541,606 | S | | 5/2007 | Griffin et al. | |
| 2005/0039583 | A1 | * | 2/2005 | McNulty | ................ A01G 3/062 |
| | | | | | 83/13 |
| 2007/0160434 | A1 | * | 7/2007 | Gillissen | ............. B23B 51/0426 |
| | | | | | 408/68 |

FOREIGN PATENT DOCUMENTS

WO    WO9814043    4/1998

\* cited by examiner

*Primary Examiner* — Thomas B Will
*Assistant Examiner* — Joel F. Mitchell

(57) ABSTRACT

A plant sawing assembly for removing plants around a sprinkler head includes a hole saw that may be positioned around a sprinkler head to remove plants growing around the sprinkler head. A receiver extends upwardly from the hole saw and a shaft is removably positioned in the receiver. The shaft is coupled to a power tool thereby facilitating the power tool to spin the hole saw to cut the plants.

9 Claims, 4 Drawing Sheets

PLANT SAWING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to sawing devices and more particularly pertains to a new sawing device for removing plants around a sprinkler head.

BRIEF SUMMARY OF THE INVENTION

An embodiment of the disclosure meets the needs presented above by generally comprising a hole saw that may be positioned around a sprinkler head to remove plants growing around the sprinkler head. A receiver extends upwardly from the hole saw and a shaft is removably positioned in the receiver. The shaft is coupled to a power tool thereby facilitating the power tool to spin the hole saw to cut the plants.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
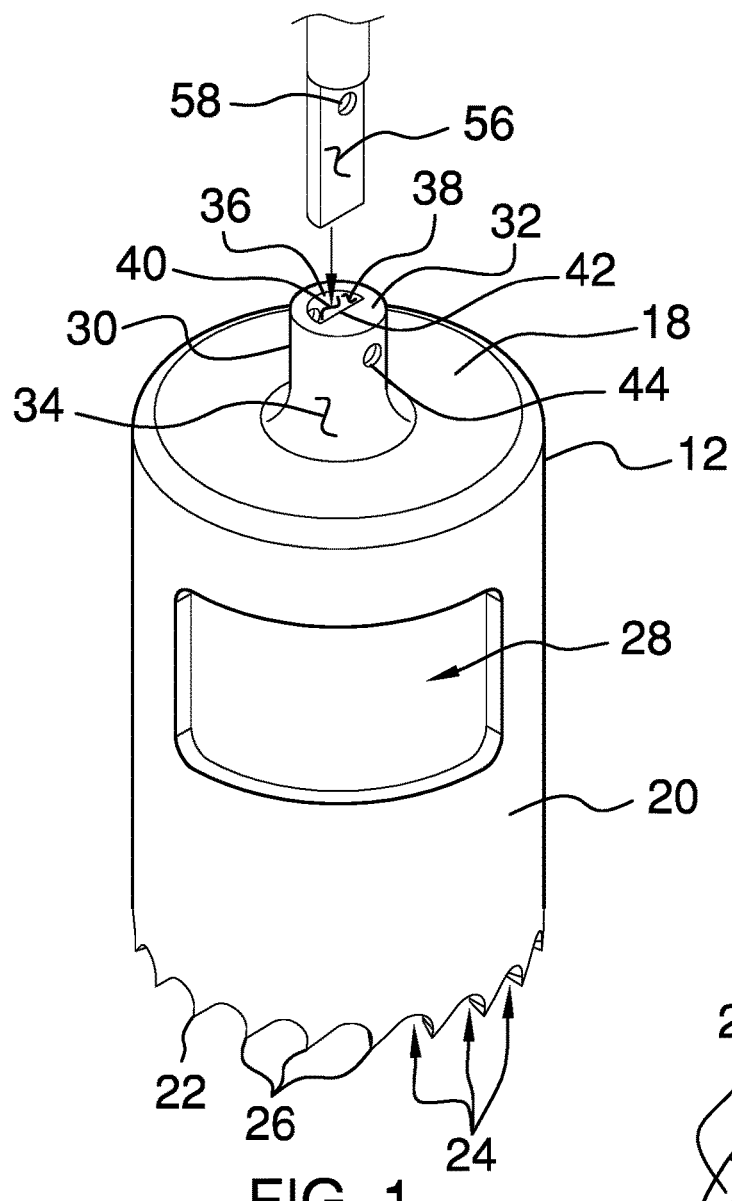
FIG. 1 is a perspective view of a plant sawing assembly according to an embodiment of the disclosure.
Figure 2:
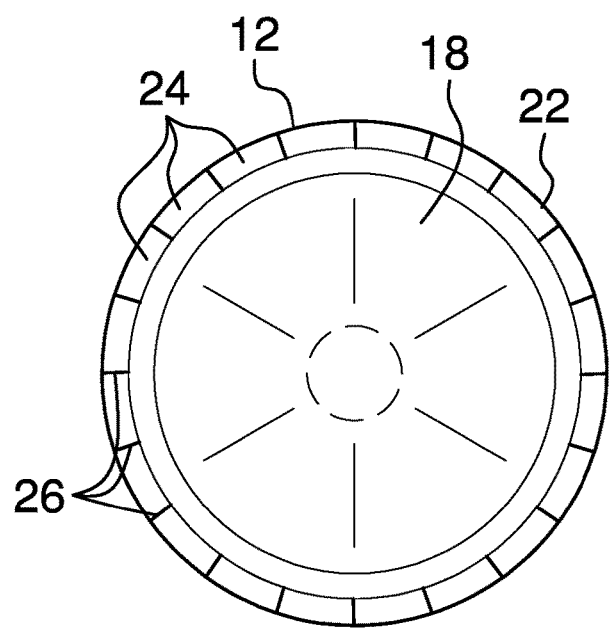
FIG. 2 is a bottom view of a hole saw of an embodiment of the disclosure.
Figure 3:
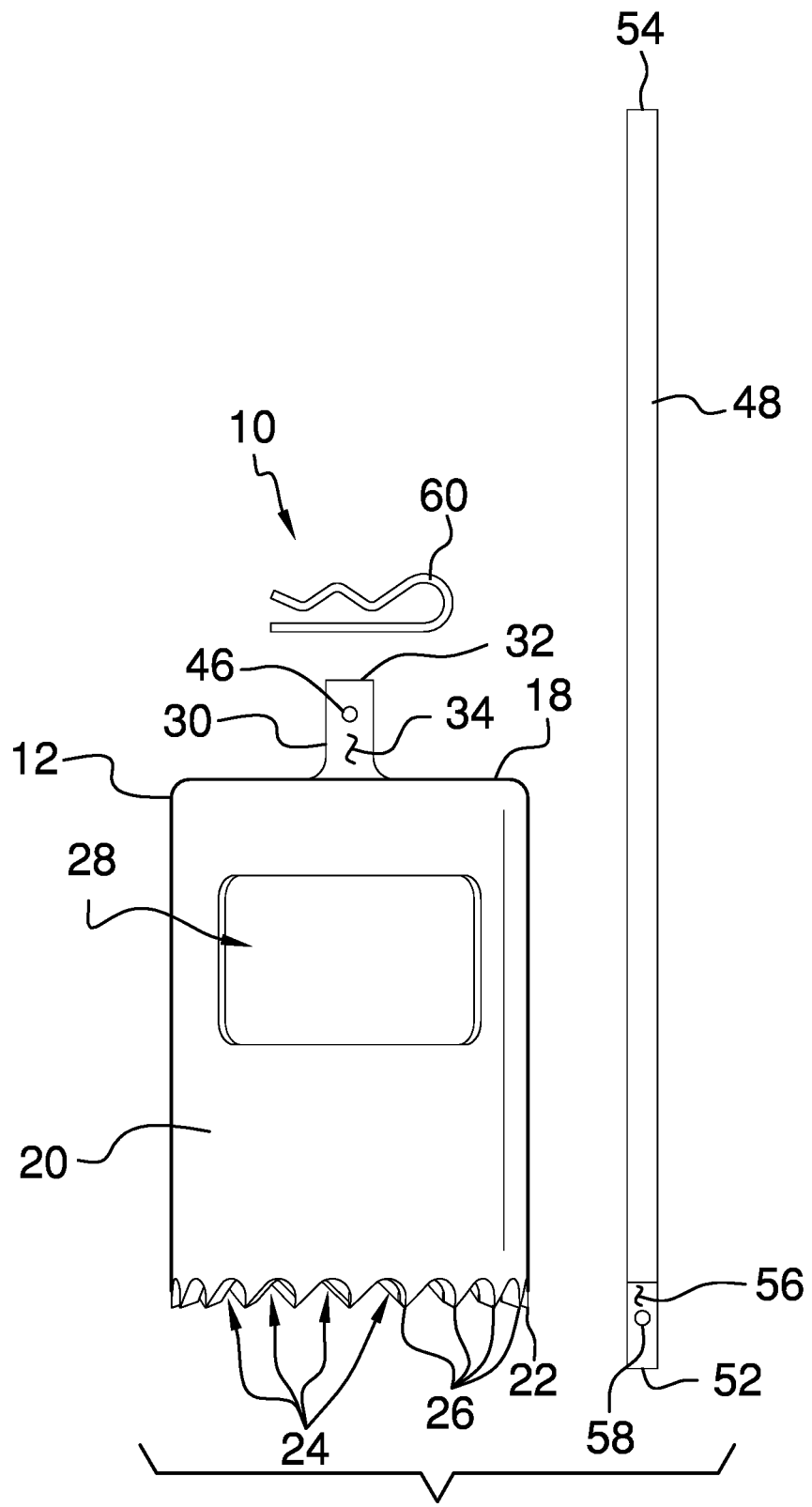
FIG. 3 is a front view of an embodiment of the disclosure.
Figure 4:
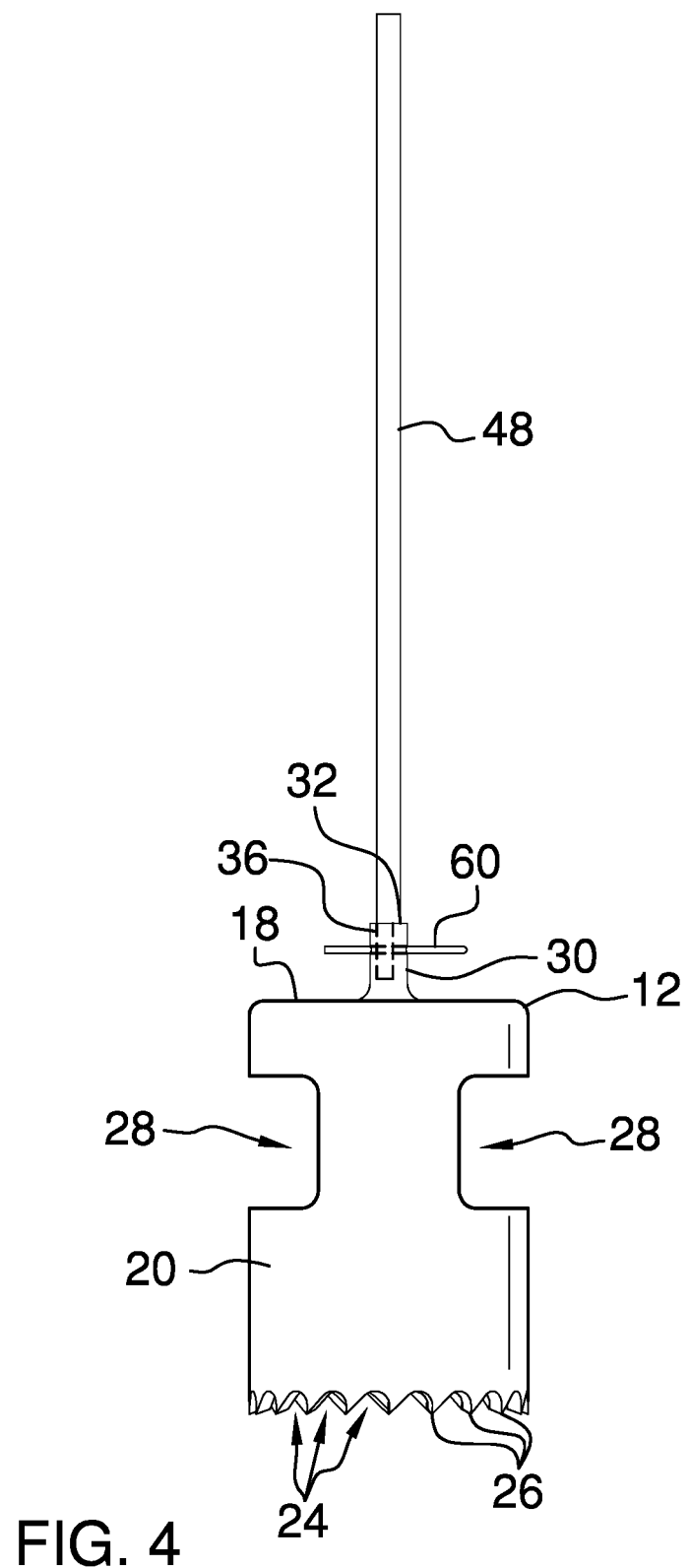
FIG. 4 is a right side view of an embodiment of the disclosure.
Figure 5:
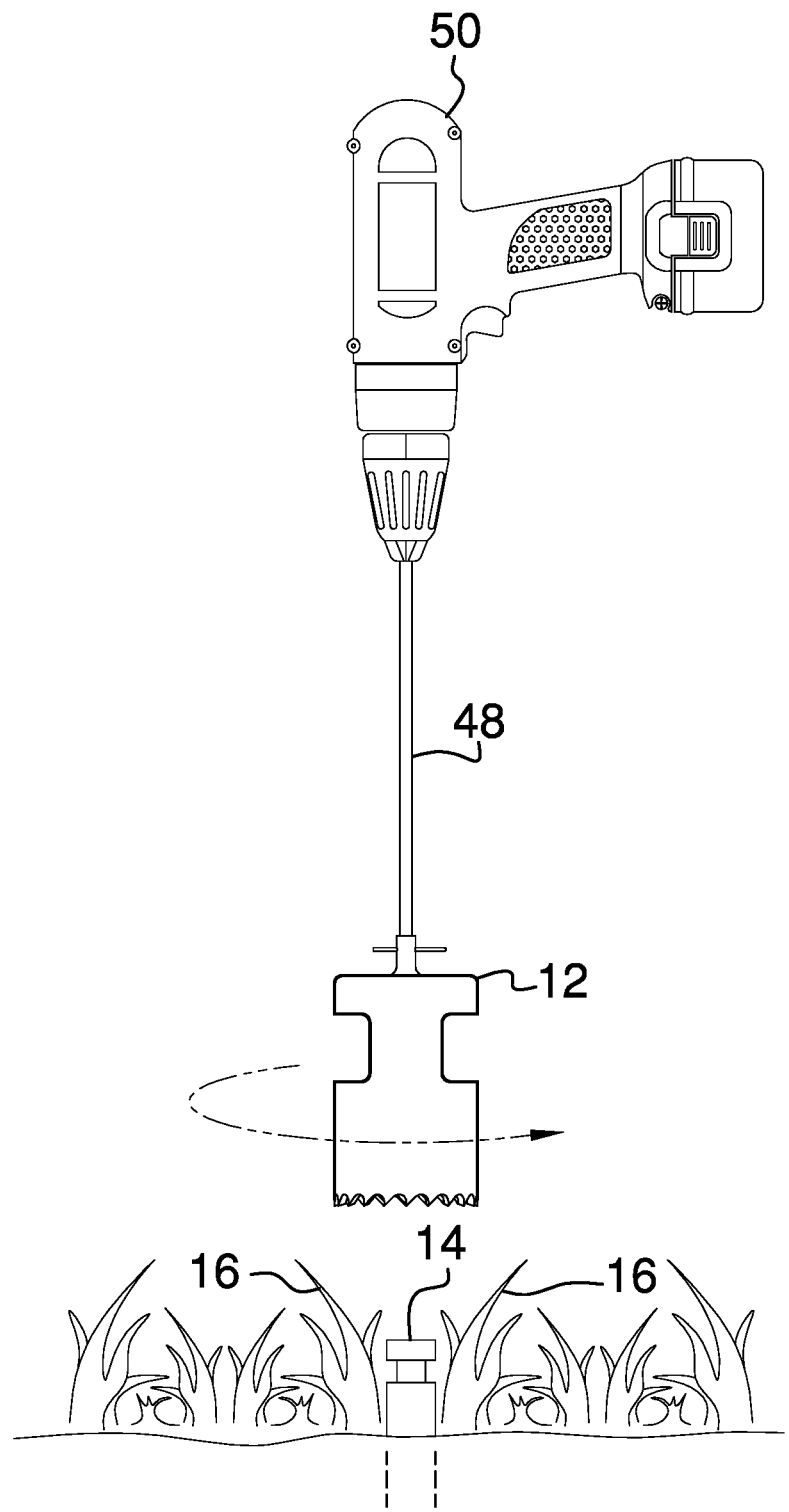
FIG. 5 is a perspective in-use view of an embodiment of the disclosure.

With reference now to the drawings, and in particular to FIGS. 1 through 5 thereof, a new sawing device embodying the principles and concepts of an embodiment of the disclosure and generally designated by the reference numeral 10 will be described.

As best illustrated in FIGS. 1 through 5, the plant sawing assembly 10 generally comprises a hole saw 12 that is selectively positioned around a sprinkler head 14 thereby facilitating the hole saw 12 to remove plants 16 growing around the sprinkler head 14. The sprinkler head 14 may be a component of a lawn irrigation system or the like. The hole saw 12 has a top wall 18 and an outer wall 20 extending downwardly therefrom. The outer wall 20 is continuous such that the hole saw 12 has a cylindrical shape.

The outer wall 20 has a distal edge 22 with respect to the top wall 18 and the distal edge 22 has a plurality of indentations 24 extending toward the top wall 18. The indentations 24 are spaced apart from each other and are distributed around the distal edge 22 to define a plurality of teeth 26 on the distal edge 22 to cut the plants 16. The outer wall 20 has a pair of openings 28 extending through the outer wall 20 and each of the openings 28 is positioned between the top wall 18 and the distal edge 22. Moreover, each of the openings 28 is positioned on opposite sides of the hole saw 12 with respect to each other. Each of the openings 28 facilitates debris to exit the hole saw 12 when the hole saw 12 is cutting the plants 16.

A receiver 30 extends upwardly from the hole saw 12 and the receiver 30 is centrally positioned on the top wall 18. The receiver 30 has a distal end 32 with respect to the top wall 18 and an outer surface 34. The distal end 32 has a well 36 extending toward the top wall 18 of the hole saw 12 and the well 36 has a bounding surface 38. The bounding surface 38 has a first side 40 and a second side 42 and the first side 40 is concavely arcuate with respect to the second side 42. The second side 42 is flattened such that the well 36 has a semicircular shape. The outer surface 34 has a first aperture 44 extending into the well 36. The outer surface 34 has a second aperture 46 extending into the well 36 and the first aperture 44 is aligned with the second aperture 46.

A shaft 48 is removably positioned in the receiver 30 and the shaft 48 is selectively coupled to a power tool 50 thereby facilitating the power tool 50 to spin the hole saw 12 to cut the plants 16. The power tool 50 may be an electric drill or the like. The shaft 48 has a first end 52 and a second end 54 and the shaft 48 is elongated between the first end 52 and the second end 54. The shaft 48 has a first surface 56 extending upwardly from the first end 52. The first surface 56 of the shaft 48 is flattened such that the first end 52 of the shaft 48 has a semicircular cross-section taken along a line extending through the first end 52 and the second end 54.

The well 36 insertably receives the first end 52 of the shaft 48 having the first surface 56 of the shaft 48 engaging the second side 42 of the bounding surface 38 of the well 36. In this way the shaft 48 is inhibited from spinning in the well 36. The shaft 48 has third aperture 58 extending therethrough and the third aperture 58 is positioned on the first surface 56 of the shaft 48. The third aperture 58 is aligned with each of the first aperture 44 and the second aperture 46 when the shaft 48 is positioned in the receiver 30. A fastener 60 is provided and the fastener 60 is selectively extended through the first aperture 44, the second aperture 46 and the third aperture 58 when the shaft 48 is positioned in the receiver 30. In this way the shaft 48 is retained in the receiver 30. The fastener 60 may be a cotter hair pin or the like.

In use, the shaft 48 is inserted into the receiver 30 and the fastener 60 is extended through the receiver 30 and the shaft 48 to retain the shaft 48 in the receiver 30. The shaft 48 is connected to the power tool 50 and the hole saw 12 is positioned around the sprinkler head 14. The power tool 50 is turned on to rotate the hole saw 12. In this way plants 16, such as grass and other plants 16 common to a yard, are cut away from around the sprinkler head 14. Thus, the sprinkler head 14 is cleared from obstructions thereby enhancing functionality of the sprinkler head 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A plant sawing assembly being configured to remove plants from around a sprinkler head, said assembly comprising:
  a hole saw being configured to be positioned around a sprinkler head thereby facilitating said hole saw to remove plants growing around the sprinkler head, said hole saw has a top wall and an outer wall extending downwardly therefrom, said outer wall being continuous such that said hole saw has a cylindrical shape, said outer wall having a distal edge with respect to said top wall, said distal edge having a plurality of indentations extending toward said top wall, said indentations being spaced apart from each other and being distributed around said distal edge to define a plurality of teeth on said distal edge wherein said teeth are configured to cut the plants;
  a receiver extending upwardly from said hole saw, said receiver being centrally positioned on said top wall, said receiver having a distal end with respect to said top wall and an outer surface, said distal end having a well extending toward said top wall of said hole saw, said well having a bounding surface, said bounding surface having a first side and a second side, said first side is concavely arcuate with respect to said second side, said second side being flattened such that said well has a semicircular shape; and
  a shaft being removably positioned in said receiver, said shaft being configured to be coupled to a power tool thereby facilitating the power tool to spin said hole saw to cut the plants.

2. The assembly according to claim 1, wherein said outer wall has a pair of openings extending through said outer wall, each of said openings being positioned between said top wall and said distal edge, each of said openings being positioned on opposite sides of said hole saw with respect to each other.

3. The assembly according to claim 1, wherein said outer surface has a first aperture extending into said well.

4. The assembly according to claim 3, wherein said outer surface has a second aperture extending into said well, said first aperture being aligned with said second aperture.

5. The assembly according to claim 4, wherein said shaft has a first end and a second end, said shaft being elongated between said first end and said second end, said shaft having a first surface extending upwardly from said first end, said first surface of said shaft being flattened such that said first end of said shaft has a semicircular cross-section taken along a line extending through said first end and said second end.

6. The assembly according to claim 5, wherein said well insertably receives said first end of said shaft having said first surface of said shaft engaging said second side of said bounding surface of said well such that said shaft is inhibited from spinning in said well.

7. The assembly according to claim 6, wherein said shaft has third aperture extending therethrough, said third aperture being positioned on said first surface of said shaft such that said third aperture is aligned with each of said first aperture and said second aperture when said shaft is positioned in said receiver.

8. The assembly according to claim 7, further comprising a fastener being selectively extended through said first aperture, said second aperture and said third aperture when said shaft is positioned in said receiver thereby retaining said shaft and said receiver.

9. A plant sawing assembly being configured to remove plants from around a sprinkler head, said assembly comprising:
  a hole saw being configured to be positioned around a sprinkler head thereby facilitating said hole saw to remove plants growing around the sprinkler head, said hole saw having a top wall and an outer wall extending downwardly therefrom, said outer wall being continuous such that said hole saw has a cylindrical shape, said outer wall having a distal edge with respect to said top wall, said distal edge having a plurality of indentations extending toward said top wall, said indentations being spaced apart from each other and being distributed around said distal edge to define a plurality of teeth on said distal edge wherein said teeth are configured to cut the plants, said outer wall having a pair of openings extending through said outer wall, each of said openings being positioned between said top wall and said distal edge, each of said openings being positioned on opposite sides of said hole saw with respect to each other;

a receiver extending upwardly from said hole saw, said receiver being centrally positioned on said top wall, said receiver having a distal end with respect to said top wall and an outer surface, said distal end having a well extending toward said top wall of said hole saw, said well having a bounding surface, said bounding surface having a first side and a second side, said first side being concavely arcuate with respect to said second side, said second side being flattened such that said well has a semicircular shape, said outer surface having a first aperture extending into said well, said outer surface having a second aperture extending into said well, said first aperture being aligned with said second aperture;

a shaft being removably positioned in said receiver, said shaft being configured to be coupled to a power tool thereby facilitating the power tool to spin said hole saw to cut the plants, said shaft having a first end and a second end, said shaft being elongated between said first end and said second end, said shaft having a first surface extending upwardly from said first end, said first surface of said shaft being flattened such that said first end of said shaft has a semicircular cross-section taken along a line extending through said first end and said second end, said well insertably receiving said first end of said shaft having said first surface of said shaft engaging said second side of said bounding surface of said well such that said shaft is inhibited from spinning in said well, said shaft having third aperture extending therethrough, said third aperture being positioned on said first surface of said shaft such that said third aperture is aligned with each of said first aperture and said second aperture when said shaft is positioned in said receiver; and a fastener being selectively extended through said first aperture, said second aperture and said third aperture when said shaft is positioned in said receiver thereby retaining said shaft and said receiver.

\* \* \* \* \*